(12) United States Patent
Wngett

(10) Patent No.: US 6,389,915 B1
(45) Date of Patent: May 21, 2002

(54) DUAL LOAD PATH BALL SCREW WITH ROD END SWIVEL

(75) Inventor: Paul Wngett, Mesa, AZ (US)

(73) Assignee: AlliedSignal, Inc., Morris Township, NJ (US)

( * ) Notice: Subject to any disclaimer, the term of this patent is extended or adjusted under 35 U.S.C. 154(b) by 0 days.

(21) Appl. No.: 09/312,465

(22) Filed: May 17, 1999

(51) Int. Cl.⁷ .............................................. F16H 25/22
(52) U.S. Cl. .................... 74/89.23; 74/424.71
(58) Field of Search ............................. 74/89.14, 89.15, 74/424.8 R; 244/75 R; 384/507, 508

(56) References Cited

U.S. PATENT DOCUMENTS

| | | | |
|---|---|---|---|
| 1,174,541 A | * 3/1916 | Bernheim | ............... 384/508 X |
| 2,620,683 A | * 12/1952 | Geyer | .................... 74/424.8 R |
| 2,660,026 A | * 11/1953 | Geyer | .................... 74/89.14 X |
| 2,660,029 A | * 11/1953 | Geyer | .................... 74/89.14 X |
| 3,404,580 A | 10/1968 | Valenti | |
| 3,404,581 A | 10/1968 | Kraus | |
| 3,422,696 A | 1/1969 | Valenti | |
| 4,597,305 A | * 7/1986 | Brusasco | .............. 74/424.8 R |
| 4,637,272 A | * 1/1987 | Teske et al. | ........... 74/424.8 R |
| 4,679,485 A | 7/1987 | Nelson et al. | |
| 4,745,815 A | 5/1988 | Klopfenstein | |
| 5,054,937 A | * 10/1991 | Hanaway | ................ 384/508 X |
| 5,092,539 A | * 3/1992 | Caero | .................... 74/424.8 R |
| 5,129,273 A | * 7/1992 | Fukui et al. | ................ 74/89.15 |
| 5,144,851 A | 9/1992 | Grimm et al. | |
| 5,193,408 A | 3/1993 | Fukui et al. | |
| 5,214,972 A | * 6/1993 | Larson et al. | .............. 74/89.15 |
| 5,228,353 A | * 7/1993 | Katahira et al. | ........... 74/89.15 |
| 5,313,852 A | 5/1994 | Arena | |
| 5,413,415 A | * 5/1995 | Collinsworth | ............... 384/508 |
| 5,613,400 A | * 3/1997 | Sato et al. | ................. 74/89.15 |
| 5,711,386 A | * 1/1998 | Swietlik | ..................... 384/508 |

* cited by examiner

Primary Examiner—Thomas R. Hannon
Assistant Examiner—Colby Hansen
(74) Attorney, Agent, or Firm—Keith Newburry, Esq.

(57) ABSTRACT

A dual drive ball has a ball screw shaft coupled at one end to a gear train and coupled at the other end to a ball screw nut. The ball screw shaft and ball screw nut are connected through complementary helical grooves filled with ball bearing balls. The outer surface of the ball screw nut is plined and can be driven by a second gear train. An output tube is coupled at one end to the ball screw nut and at its opposite end has a connector portion with a groove on its inner surface. A rod end has a coupling member for coupling to a surface to be actuated and a shaft portion with a groobe on its outer surface. This shaft portion is received with in the outputtube portion and the corresponding grooves are coupled through the use of a plurality of ball bearing balls.

20 Claims, 5 Drawing Sheets

DUAL LOAD PATH BALL SCREW WITH ROD END SWIVEL

GOVERNMENT RIGHTS

The invention described herein was made in the performance of work under NASA Contract No. NCC8-115 and is subject to the provisions of Section 305 of the National Aeronautics and Space Act of 1958 (42 U.S.C. 2457).

TECHNICAL FIELD

This invention relates to actuator systems having dual drive path ball screws and more particularly to a secondary drive path ball screw having a rod end swivel.

BACKGROUND OF THE INVENTION

There are many components of an aircraft that are positioned by operation of a ball screw actuator. In such an actuator, there is relative rotation between a ball screw and a ball screw nut to achieve linear translation of the ball screw nut. One of the actuator elements is fixed and the other actuator element is connected to a flight control surface. Because of use of a dual drive ball screw actuator in controlling critical surfaces for aircraft flight, it is common to construct the ball screw of inner and outer tubular members which are interconnected at their ends. The inner tubular member provides a primary drive path for the ball screw and the outer tubular member provides a secondary drive path to be used in the event of a failure in the primary drive path. This structure is known as a dual drive actuator.

In the primary drive path, the inner tubular member is rotated. The inner tubular member has a helical ball groove which is associated with the ball screw nut by means of balls positioned in a portion of the helical groove so that rotation of the inner tubular member will cause the linear translation of the ball screw nut. The ball screw nut, in turn, is connected to an output tube which is connected to a rod end by a rod end swivel. The rod end is connected to the flight control surface to be actuated. So as ball screw translates linearly so does the output tube, rod end swivel and the rod end which then moves the flight control surface.

In the secondary drive path, the ball screw nut is rotated while locking the primary screw, which in turn rotates and linearly translates the output tube. However, rod end cannot be rotating. Therefore a rod end swivel is used to remove the rotation so that the rod end only moves linearly. FIG. 1, shows a typical prior art rod end swivel assembly 1. The assembly 1 includes a housing 2 mounted about the output tube 3. A thrust shaft 4 is mounted for rotation with the output tube 3 by a series of needle bearings 5 and thrust bearings 6. Mounted to the thrust shaft is the rod end shaft 7. These bearings remove the rotation so that the rod end only movers linearly.

Because dual load path ball screws are often used in flight control applications, it is imperative that their weight and size be kept as small as possible. A disadvantage to the rod end swivel shown in FIG. 1 is that to handle the thrust load that can be generated in certain aerospace applications, the rod end swivel becomes too large and too heavy.

Accordingly, a need exists for a rod end swivel that can handle the larger thrust loads encountered in some aerospace applications without becoming too large and/or too heavy.

SUMMARY OF THE INVENTION

An object of this invention is to provide a dual drive ball screw having a rod end swivel that for a given thrust load is smaller and lighter that prior art dual drive ball screws.

The present invention achieves this object providing a drive path ball screw having a ball screw shaft coupled at one end to a gear train and coupled at the other end to a ball screw nut. The ball screw shaft and ball screw nut are coupled through complementary helical grooves filled with ball bearing balls. The outer surface of the ball screw nut is splined and can be driven by a second gear train. An output tube is coupled at one end to the ball screw nut and at its opposite end has a connector portion with a groove on its inner surface. A rod end has a coupling member for coupling to a surface to be actuated and a shaft portion with a groove on its outer surface. This shaft portion is received within the connector portion and the corresponding grooves are coupled through the use of a plurality of ball bearings. This arrangement for coupling the rod end to the connector portion, referred to as a rod end swivel, improves the performance of the ball screw over the prior art ball screws that use thrust and needle bearings.

These and other objects, features and advantages of the present invention are specifically set forth in or will become apparent from the following detailed description of a preferred embodiment of the invention when read in conjunction with the accompanying drawings.

DESCRIPTION OF THE INVENTION

Figure 1:
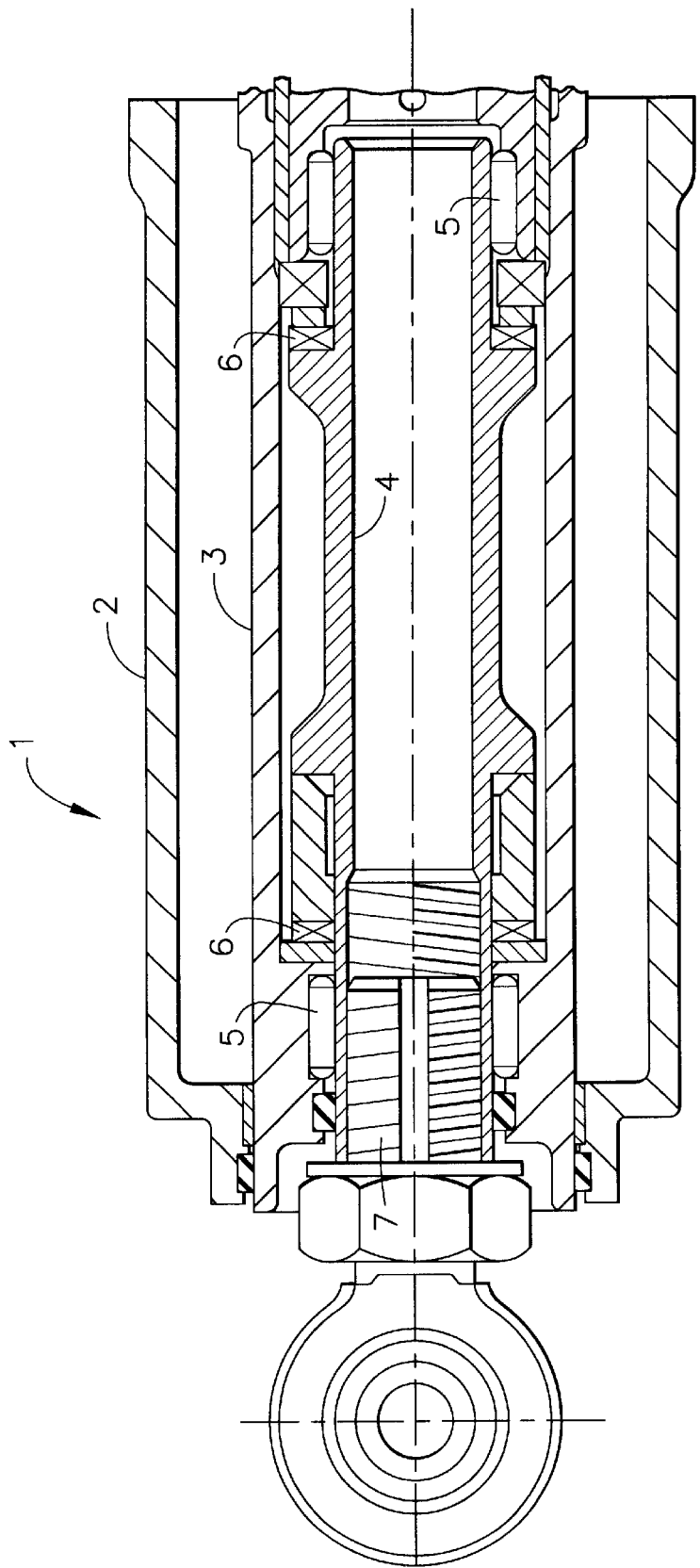
FIG. 1 is a cross-section of a prior art rod end swivel.
Figure 2:
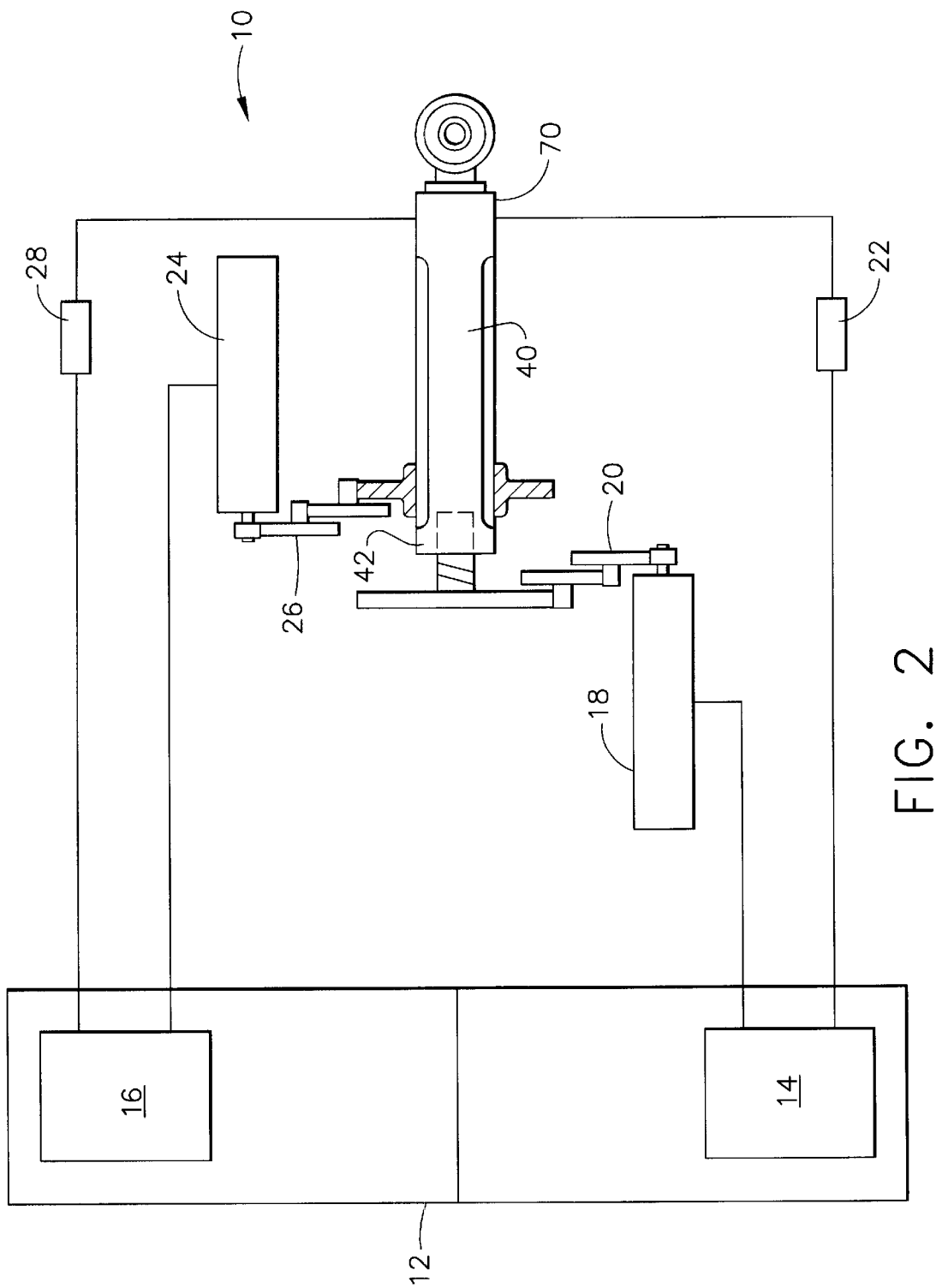
FIG. 2 is a schematic of an actuator system employing a dual drive ball screw having a rod end swivel contemplated by the present invention.

FIG. 2 shows an actuator system 10 that has a dual drive ball screw 40 contemplated by the present invention. The operation of the system 10 is controlled by an electronic control unit 12 which has a primary controller 14 and a secondary controller 16. When movement of a control surface to which the ball screw 40 is attached is required, the primary controller 14 sends a signal to a primary motor 18 which in turn drives the primary gear train 20. The primary gear train 20 is secured to a support structure, (not shown) and is also coupled to an inner tubular member 42 of the dual drive ball screw 40. A linear variable displacement transducer 22 measures the linear position of the output tube 70 of the ball screw 40 and sends a signal indicative of such position to the primary controller 14, thereby closing the control loop. When the required position of the control surface is reached, the primary controller 14 stops the movement of the ball screw 40. The combination of primary controller 14, primary motor 18, primary gear train 20 and ball screw 40 define the primary drive path.

In the event of a failure in the primary drive a secondary drive is provided. The secondary drive includes the secondary controller 16 which controls a secondary motor 24 which in turn drives a secondary gear train 26. The secondary gear train 26, like its counterpart, is secured to a support structure, (not shown). The gear train 26 is also coupled to a ball screw nut 60 of the dual drive ball screw 40. A linear variable displacement transducer 28 measures the linear position of the outputs tube 70 of the ball screw 40 and sends a signal indicative of such position to the secondary controller 16, thereby closing the control loop. The secondary drive path operates in the same control manner as the primary drive path described above. When the primary drive path is operating the secondary drive path is locked.

Figure 3:
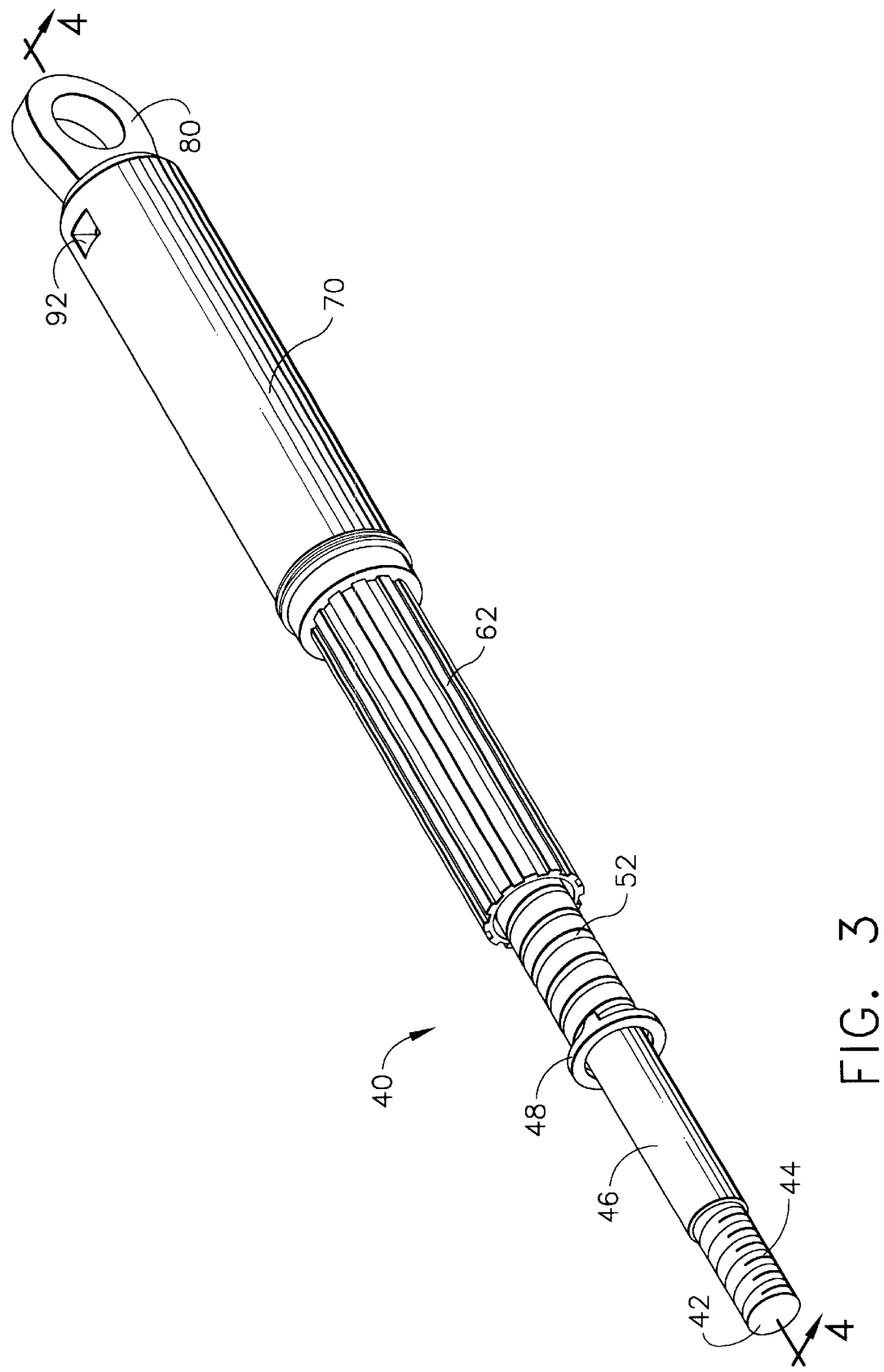
FIG. 3 is a perspective view of the dual drive ball screw of FIG. 2.
Figure 4:
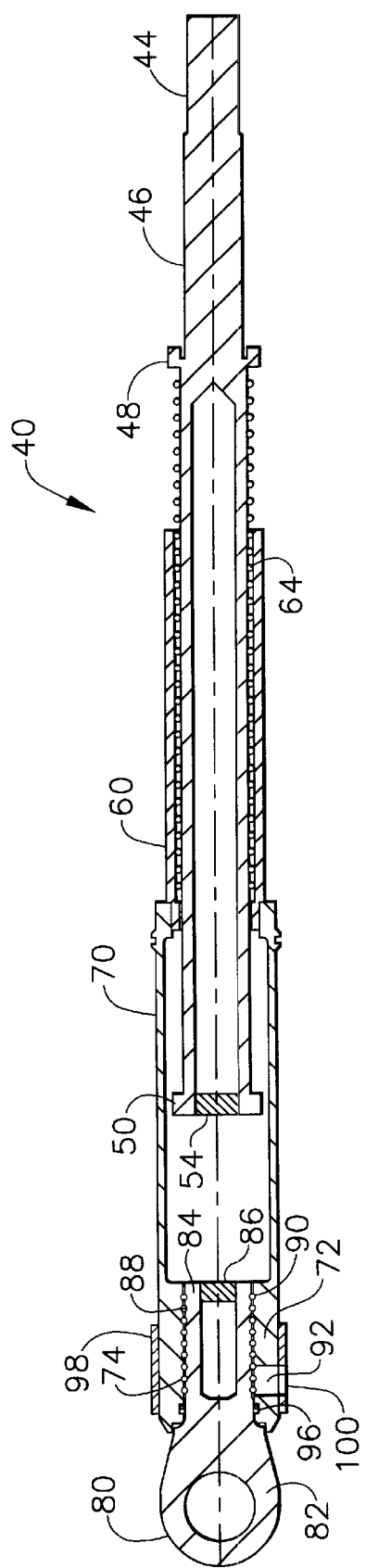
FIG. 4 is a cross-section taken along line 4—4 of FIG. 3.

Referring to FIGS. 3 and 4, the inner tubular member 42, which is also referred to as a ball screw shaft, has at one end a threaded portion 44 which is coupled to and driven by the primary gear train 20. Adjacent the threaded portion 44 is a smooth portion 46 which extends from the threaded portion 44 to a first stop member 48. A second stop member 50 is located at the end of the ball screw shaft 42 opposite the end having the threaded portion. Between stop member 48 and stop member 50, the surface of the ball screw shaft 42 has a helical ball groove 52, (not shown in FIG. 4 for purposes of clarity). The ball screw shaft 42 may be solid or to reduce weight it may be hollowed out. If hollowed, then a plug 54 is needed to prevent grease from entering the hollowed portion.

The ball screw nut 60 is also a tubular shaft having on its outer surface splines 62 for coupling to and being driven by secondary drive train 26. On its inner surface, the ball screw nut has a helical groove, (not shown). The portion of the ball screw shaft 42 between the stops 48 and 50 is disposed within the ball screw nut 60 so that the helical groove on the inside surface of the screw nut 60 is connected to the helical groove on the outside of the ball screw shaft 42 by a plurality of balls 64. Thus the rotational movement of the ball screw shaft 42 is translated into linear motion of the ball screw nut 60.

Figure 5:
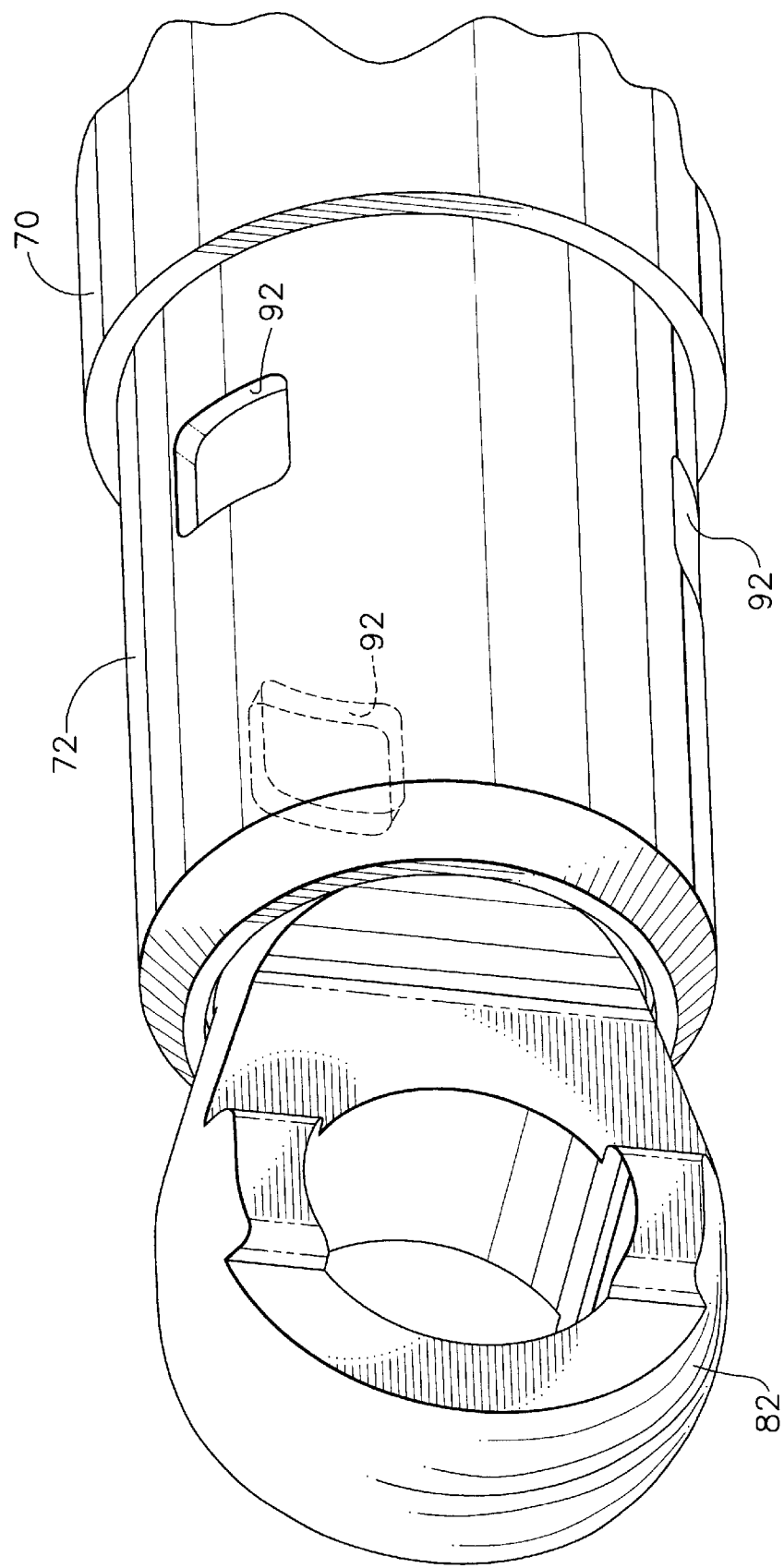
FIG. 5 is a perspective view of an end of the dual drive ball screw of FIG. 2, depicting a plurality of slots.

The ball screw nut 60 is coupled by preferably a thread and pin to one end of the output tube 70. At the opposite end the output tube 70 has a connector portion 72 having on its inner surface an annular groove 74. A rod end 80 has a coupling member 82 which is attached to the flight control surface, (not shown), requiring actuation, and a shaft portion 84. The shaft portion 84 may be hollow, in which case a plug 86 is used to prevent grease from entering the hollowed portion. The outer surface of the shaft portion 84 has an annular groove 88, which is the same type as the groove 74 on the inner surface of the connector portion 72. The shaft portion 84 is disposed within the connector portion 72 so that the groove 74 is connected to the groove 88 by a plurality of balls 90. The connector portion 72 has three holes or slots 92, only one of which is shown, in FIGS. 3 and 4 that are axially and circumferentially staggered. Reference should be made to FIG. 5, which provides a perspective view of an end of the dual drive ball screw 40 and which indicates more clearly the arrangement of the three slots 92 in the connector portion 72. For clarity, the slot 92 on the back side of the connector portion is shown in phantom. Once the shaft portion 82 is inserted in the connector portion 72, the balls 90 are inserted through these holes 92 until the grooves 74,88 are filled with ball bearing balls 90 balls. The slots 92 are then plugged. A retaining sleeve 98 covers the connector portion 72 and a hole 100 that aligns with slot 92 when the balls are being inserted. A seal 96 prevents contaminants from entering these grooves 74,88. The combination of the rod end 80 and the connector portion 72 is referred to as a rod end swivel.

During operation of the primary drive, the inner tubular member or ball screw shaft 42 is rotated causing the ball screw nut 60, output tube 70, and the rod end 80 to translate linearly. When the secondary drive is in operation, the ball screw nut 60 is both rotating and translating linearly as the ball screw shaft 42 is neither rotating nor moving linearly. The output tube 70 is also rotating and translating linearly. However, by use of the rod end swivel, the rod end 80 only moves linearly with the output tube 70. Because the rod end swivel uses grooves and balls, for a given size it can handle much larger thrust loads than prior art rod ends, or for a given thrust load it will be smaller and lighter.

Various modifications and alterations to the above-described preferred embodiment will be apparent to those skilled in the art. Accordingly, these descriptions of the invention should be considered exemplary and not as limiting the scope and spirit of the invention as set forth in the following claims.

What is claimed is:

1. A dual drive ball screw comprising:
   a ball screw shaft having a first portion with an outer surface adapted for engaging a first rotatable structure and a second portion having a first groove on its outer surface;
   a ball screw nut having an outer surface adapted for engaging a second rotatable structure and having a second groove on its inner surface, said ball screw nut receiving said second portion of said ball screw shaft so that said first and second grooves connect through a first plurality of balls;
   a rod end having a coupling member for attaching to a surface to be actuated and a shaft portion having a third groove on its outer surface; and
   an output tube coupled at one end to said ball screw nut and at its opposite end having a connector portion having an inner surface with a fourth groove, said connector portion receiving said shaft portion of said rod end so that said third and fourth grooves connect through a second plurality of balls, wherein said connector portion comprises three slots that are offset from one another both axially along, and circumferentially around, said connector, for inserting said second plurality of balls between said third and fourth grooves.

2. The dual drive ball screw of claim 1 wherein said third and fourth grooves are annular grooves.

3. The dual drive ball screw of claim 2 wherein said first and second grooves are helical grooves.

4. The dual drive ball screw of claim 3 wherein said shaft portion is hollow.

5. The dual drive ball screw of claim 4 wherein said second portion ball screw shaft is hollow.

6. The dual drive ball screw of claim 1 wherein said outer surface of said ball screw nut is splined.

7. The dual drive screw of claim 1 wherein said outer surface of said first portion of said ball screw shaft is threaded.

8. An actuator system comprising:
   an electronic control unit having a primary controller and a secondary controller;
   a primary motor controlled by said primary controller and drivingly coupled to a primary gear train;
   a secondary motor controlled by said secondary controller and drivingly coupled to a secondary gear train; and
   a dual drive screw, said screw comprising:
   a ball screw shaft having a first portion coupled to said primary gear train and a second portion having a first groove on its outer surface;
   a ball screw nut having an outer surface coupled to said secondary gear train and having a second groove on its inner surface, said ball screw nut receiving said second portion of said ball screw shaft so that said first and second grooves connect through a first plurality of balls;

a rod end having a coupling member for attaching to a surface to be actuated and a shaft portion having a third groove on its outer surface; and an output tube coupled at one end to said ball screw nut and at its opposite end having a connector portion having an inner surface with a fourth groove, said connector portion receiving said shaft portion of said rod end so that said third and fourth grooves connect through a second plurality of balls, wherein said connector portion comprises three slots that are offset from one another both axially along, and circumferentially around, said connector, for inserting said second plurality of balls between said third and fourth grooves.

9. The actuator system of claim 8 further comprising a first sensor for sensing the position of said output tube and transmitting a signal thereof to said primary controller.

10. The actuator system of claim 9 further comprising a second sensor for sensing the position of said output tube and transmitting a signal thereof to said secondary controller.

11. The actuator system of claim 10 wherein said first and second sensors are linear variable displacement transducers.

12. The actuator system of claim 8 wherein said first and second grooves are helical grooves.

13. The actuator system of claim 12 wherein said shaft portion is hollow.

14. The actuator system of claim 13 wherein said second portion of said ball screw shaft is hollow.

15. The actuator system of claim 14 wherein said outer surface of said ball screw nut is splined.

16. The actuator system of claim 15 wherein said outer surface of said first portion of said ball screw shaft is threaded.

17. A dual drive ball screw comprising:
a ball screw shaft having a first portion with an outer surface adapted for engaging a first rotatable structure and a second portion having a first groove on its outer surface;

a ball screw nut having an outer surface adapted for engaging a second rotatable structure and having a second groove on its inner surface, said ball screw nut receiving said second portion of said ball screw shaft so that said first and second grooves connect through a first plurality of balls;

a rod end having a coupling member for attaching to a surface to be actuated and a shaft portion having a third groove on its outer surface;

an output tube coupled at one end to said ball screw nut and at its opposite end having a connector portion having an inner surface with a fourth groove, said connector portion receiving said shaft portion of said rod end so that said third and fourth grooves connect through a second plurality of balls; and a retaining sleeve surrounding at least a portion of said connector portion, said sleeve including at least one opening collocated with said at least one slot and being movable to cover said at least one slot, wherein said connector portion has at least one slot for inserting said second plurality of balls between said third and fourth grooves.

18. A dual drive ball screw comprising:
a ball screw shaft having a first portion with an outer surface adapted for engaging a first rotatable structure and a second portion having a first groove on its outer surface;

a ball screw nut having an outer surface adapted for engaging a second rotatable structure and having a second groove on its inner surface, said ball screw nut receiving said second portion of said ball screw shaft so that said first and second grooves connect through a first plurality of balls;

a rod end having a coupling member for attaching to a surface to be actuated and a shaft portion having a third groove on its outer surface;

an output tube coupled at one end to said ball screw nut and at its opposite end having a connector portion having an inner surface with a fourth groove, said connector portion receiving said shaft portion of said rod end so that said third and fourth grooves connect through a second plurality of balls; and a seal positioned proximate an end of said connector portion and interposed between an inner periphery of said connector portion and an outer periphery of said rod end shaft portion, wherein said connector portion has at least one slot for inserting said second plurality of balls between said third and fourth grooves.

19. An actuator system comprising:
an electronic control unit having a primary controller and a secondary controller;

a primary motor controlled by said primary controller and drivingly coupled to a primary gear train;

a secondary motor controlled by said secondary controller and drivingly coupled to a secondary gear train; and a dual drive screw, said screw comprising:
a ball screw shaft having a first portion coupled to said primary gear train and a second portion having a first groove on its outer surface;

a ball screw nut having an outer surface coupled to said secondary gear train and having a second groove on its inner surface, said ball screw nut receiving said second portion of said ball screw shaft so that said first and second grooves connect through a first plurality of balls;

a rod end having a coupling member for attaching to a surface to be actuated and a shaft portion having a third groove on its outer surface;

an output tube coupled at one end to said ball screw nut and at its opposite end having a connector portion having an inner surface with a fourth groove, said connector portion receiving said shaft portion of said rod end so that said third and fourth grooves connect through a second plurality of balls, and including at least one slot for inserting said second plurality of balls between said third and fourth grooves ; and a retaining sleeve surrounding at least a portion of said connector portion, said sleeve including at least one opening collocated with said at least one slot and being movable to cover said at least one slot.

20. An actuator system comprising:
an electronic control unit having a primary controller and a secondary controller;

a primary motor controlled by said primary controller and drivingly coupled to a primary gear train;

a secondary motor controlled by said secondary controller and drivingly coupled to a secondary gear train; and a dual drive screw, said screw comprising:
a ball screw shaft having a first portion coupled to said primary gear train and a second portion having a first groove on its outer surface;

a ball screw nut having an outer surface coupled to said secondary gear train and having a second groove on its inner surface, said ball screw nut receiving said second portion of said ball screw shaft so that said first and second grooves connect through a first plurality of balls;

a rod end having a coupling member for attaching to a surface to be actuated and a shaft portion having a third groove on its outer surface;

an output tube coupled at one end to said ball screw nut and at its opposite end having a connector portion having an inner surface with a fourth groove, said connector portion receiving said shaft portion of said rod end so that said third and fourth grooves connect through a second plurality of balls, and including at least one slot for inserting said second plurality of balls between said third and fourth grooves ; and a seal positioned proximate an end of said connector portion and interposed between an inner periphery of said connector portion and an outer periphery of said rod end shaft portion.

* * * * *

UNITED STATES PATENT AND TRADEMARK OFFICE
CERTIFICATE OF CORRECTION

PATENT NO. : 6,389,915 B1
DATED : May 21, 2002
INVENTOR(S) : Paul Wingett

It is certified that error appears in the above-identified patent and that said Letters Patent is hereby corrected as shown below:

<u>Title page,</u>
Item [75], replace "Paul Wngett" with -- Paul Wingett --.

Signed and Sealed this

Third Day of December, 2002

JAMES E. ROGAN
*Director of the United States Patent and Trademark Office*